United States Patent
West

(10) Patent No.: US 7,962,307 B2
(45) Date of Patent: Jun. 14, 2011

(54) INTEGRATED APPARATUS FOR MEASURING STATIC PRESSURE

(75) Inventor: James Anthony West, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 27 days.

(21) Appl. No.: 12/390,575

(22) Filed: Feb. 23, 2009

(65) Prior Publication Data

US 2010/0217541 A1    Aug. 26, 2010

(51) Int. Cl.
*G01L 7/00* (2006.01)
*G06F 19/00* (2006.01)
(52) U.S. Cl. ..................................................... 702/138
(58) Field of Classification Search ............. 702/138
See application file for complete search history.

(56) References Cited

U.S. PATENT DOCUMENTS

| | | | | |
|---|---|---|---|---|
| 4,275,559 A * | 6/1981 | Blair | ...... | 60/39.827 |
| 5,247,251 A * | 9/1993 | Yost et al. | ...... | 324/220 |
| 5,349,873 A * | 9/1994 | Omura et al. | ...... | 73/862.68 |
| 5,442,958 A * | 8/1995 | Hagen | ...... | 73/170.02 |
| 5,797,266 A * | 8/1998 | Brocard et al. | ...... | 60/725 |
| 6,742,394 B1 * | 6/2004 | Stuttaford et al. | ...... | 73/700 |
| 2007/0039588 A1 * | 2/2007 | Kobayashi | ...... | 123/304 |
| 2008/0149077 A1 * | 6/2008 | Nau et al. | ...... | 123/564 |
| 2009/0138170 A1 * | 5/2009 | Nemet et al. | ...... | 701/100 |
| 2010/0000326 A1 * | 1/2010 | Guo | ...... | 73/724 |

* cited by examiner

*Primary Examiner* — Cindy Hien-Dieu Khuu
(74) *Attorney, Agent, or Firm* — Cantor Colburn LLP

(57) ABSTRACT

An apparatus for measuring a static pressure inside a component is provided. The apparatus includes a housing coupled to the component, the housing includes a moveable component disposed therein, the moveable component operably extendable into the component and retractable from the component in response to the static pressure inside the component: and a sensor disposed in the housing and thermally protected from fluids inside the component, the sensor is configured to enable the determination of the static pressure inside the component.

19 Claims, 4 Drawing Sheets

INTEGRATED APPARATUS FOR MEASURING STATIC PRESSURE

BACKGROUND OF THE INVENTION

The subject matter disclosed herein relates to a system and method for measuring static pressure inside a device.

Measurement of combustor pressure drop is an important variable for accurate gas turbine performance estimation and engine health monitoring. This information can be used to estimate the core flow through the combustor, which aids in the determination of secondary flow rates. Additionally, combustor pressure drop measurement can be used to monitor the health of the combustor.

Currently, a measurement of the pressure entering the combustor is part of the standard instrumentation for a gas turbine, but pressure measurements inside the combustor are not standard, therefore pressure drop across the combustor cannot be calculated on most fielded units.

Additionally, when internal pressure instrumentation is installed today, significant changes must be made to the combustor liner wall to accept the instrumentation probe. These changes include drilling a hole in the liner wall and welding a ferule/retainer to the liner. The addition of these features results in air being diverted from the combustion zone to the instrumentation location for: 1) cooling the weld for the ferule and 2) the leakage that results between the ferule/retainer and the pressure probe. Both the loss of air in the combustion zone and the increased cost of these design features are negatives that should be avoided.

Accordingly, it is desirable to be able to measure the static pressure inside a component of a gas turbine with minimal cost impact. Further, it is desirable to be able to measure the static pressure inside a component of a gas turbine without compromising the integrity of the component/gas turbine design.

BRIEF DESCRIPTION OF THE INVENTION

According to one aspect of the invention, an apparatus for measuring a static pressure inside a component is provided. The apparatus includes a housing coupled to the component, the housing includes a moveable component disposed therein, the moveable component operably extendable into the component and retractable from the component in response to the static pressure inside the component; and a sensor disposed in the housing and thermally protected from fluids inside the component, the sensor is configured to enable the determination of the static pressure inside the component.

According to another aspect of the invention, a system for measuring static pressure inside a combustor is provided. The system includes a housing coupled to the combustor, the housing includes a moveable component disposed therein, the moveable component operably extendable into the combustor and retractable from the combustor in response to the static pressure inside the combustor; a sensor disposed in the housing and thermally protected from fluids inside the combustor, the sensor is configured to enable the determination of the static pressure inside the combustor; and a processor in communication with the sensor, the processor is configured to determine the static pressure inside the combustor.

According to yet another aspect of the invention, a system for measuring static pressure inside a combustor is provided. The system includes a housing coupled to the combustor, the housing includes a moveable component disposed therein, the moveable component operably extendable into the combustor and retractable from the combustor in response to the static pressure inside the combustor; a sensor disposed in the housing and thermally protected from fluids inside the combustor, the sensor is further configured to measure a force acting on the moveable component, the force acting on the moveable component increases as the static pressure inside the combustor increases; and a processor in communication with the sensor, the processor is configured to determine the static pressure inside the combustor.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
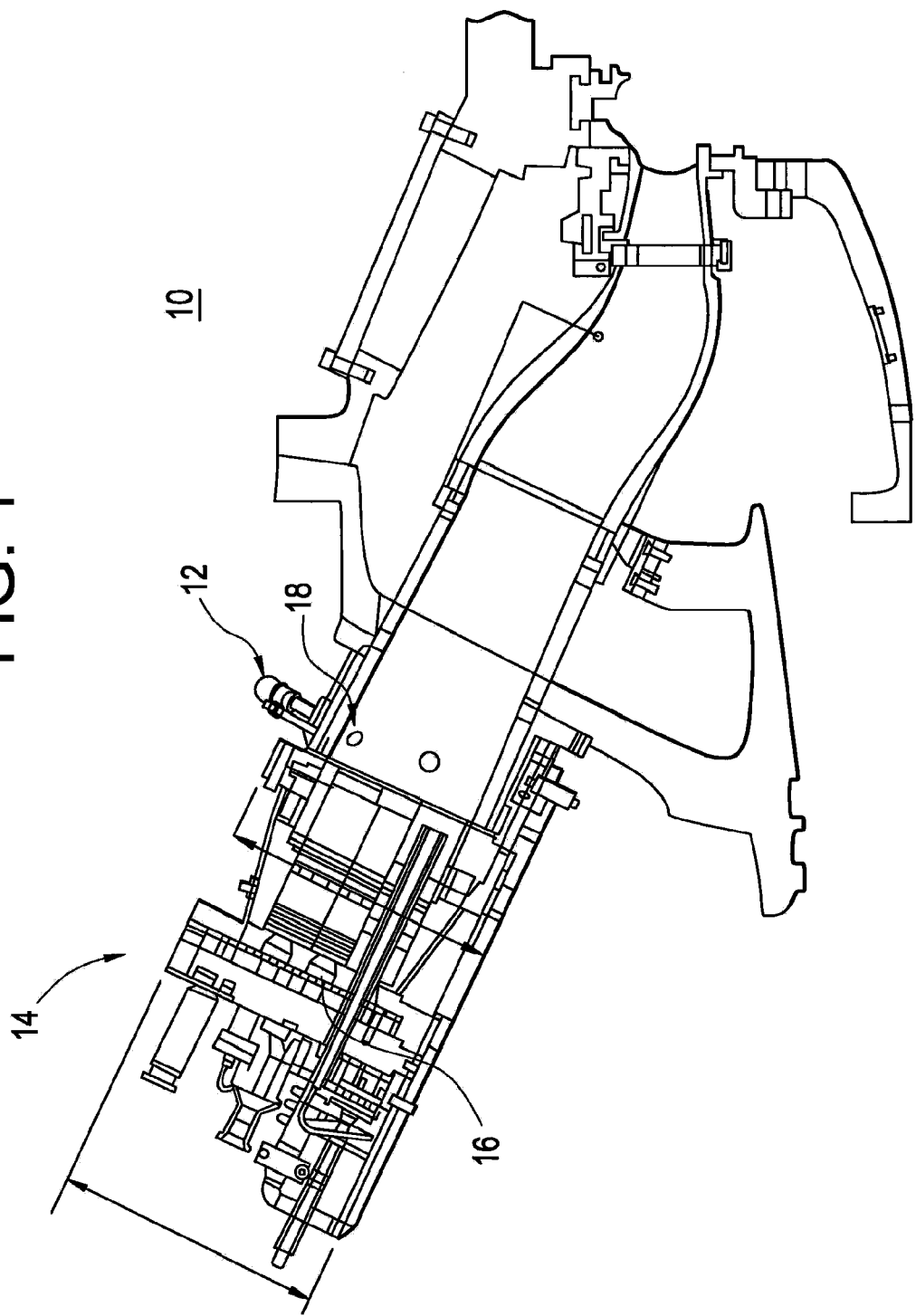
FIG. 1 is a schematic of a combustor with an apparatus for measuring static pressure inside the combustor in accordance with one exemplary embodiment of the present invention.

The detailed description explains embodiments of the invention, together with advantages and features, by way of example with reference to the drawings.

DETAILED DESCRIPTION OF THE INVENTION

Exemplary embodiments are directed to an apparatus (e.g., a spark plug) with a sensor for measuring static pressure inside a component (e.g., combustor). In one exemplary embodiment, the sensor is disposed in a housing of the apparatus and is thermally protected from fluids inside the component. Exemplary embodiments are also directed to a system incorporating these exemplary apparatuses for measuring the static pressure inside a component of a system (e.g., gas turbine) and a method for assembling the same with minimal cost impact and without compromising the integrity of the component/system. Further, in these embodiments, the system includes a processor for determining the static pressure inside the component.

In accordance with one exemplary embodiment, a sensor is installed or integrated in a housing that thermally protects the sensor from fluids of a system in which the housing is incorporated into in order to measure the static pressure inside the system. In one non-limiting exemplary embodiment, the sensor (e.g., piezoelectric transducer) is installed or integrated axially between a moveable component and a housing that thermally protects the sensor from fluids of a system. For example, the sensor can be installed axially between a retractable probe and a body of a spark plug, which can be incorporated into a combustor chamber of a gas turbine. In this example, the retractable probe extends into the combustion chamber when the chamber pressure is low (such as when the unit is off). After ignition, the pressure in the combustor is increased and the probe is forced to retract to the liner wall of the combustor until the probe stops against the body of the spark plug housing. Once the probe is fully retracted and is pressing against the transducer the axial pressure force acting on the probe can be measured, thereby providing feedback on the static pressure inside the combustor. Alternatively, the sensor is mounted on the moveable component disposed in the housing in accordance with one non-limiting exemplary embodiment. Using the same example above, the sensor can be mounted on the probe for measuring axial stress/force on the probe providing feedback on the static pressure inside the combustor in accordance with other exemplary embodiments of the present invention. In yet another alternative embodiment, the sensor is mounted on the moveable component shaft to measure the compression of the moveable component, which is translated to the axial stress/force on the moveable component, providing feedback on the static pressure inside the combustor. These various configurations provide valuable data (e.g., static pressure inside the combustor) for performance and health monitoring with minimal cost impact and could be easily retrofitted to existing units that do not have the required instrumentation design features for direct system pressure measurements.

Now referring to the drawings, FIG. 1 is a schematic illustrating a system 10 for measuring the static pressure inside a combustor of a gas turbine in accordance with one exemplary embodiment. The system 10 includes an apparatus 12 being incorporated into a combustor assembly 14 of a gas turbine engine (not shown) and configured to measure the static pressure inside the combustor without impacting both cost and combustor performance. In accordance with one exemplary embodiment, the apparatus 12 is a spark plug as shown. Of course other known devices that can house a sensor and thermally protect the same from the combustor fluids in order to measure the static pressure inside the combustor without compromising the integrity or the performance of the combustor can be used in other exemplary embodiments. For ease of discussion, a spark plug configuration will be discussed in greater detail below.

The apparatus 12 in accordance with exemplary embodiments of the present invention can be incorporated into a combustor assembly with varying configurations and should not be limited to the configuration shown in FIG. 1. In general, high-pressure gas is supplied to combustor assembly 14 and mixed with fuel, for example process gas and/or synthetic gas, in a nozzle 16. The fuel/air or combustible mixture is passed into a combustor chamber 18 and ignited by the spark plug 12 to form a high pressure, high temperature combustion gas stream. The static pressure inside the combustor chamber 18 is then measured by the spark plug in accordance with one exemplary embodiment, which will be described in more detail below.

Figure 2A:
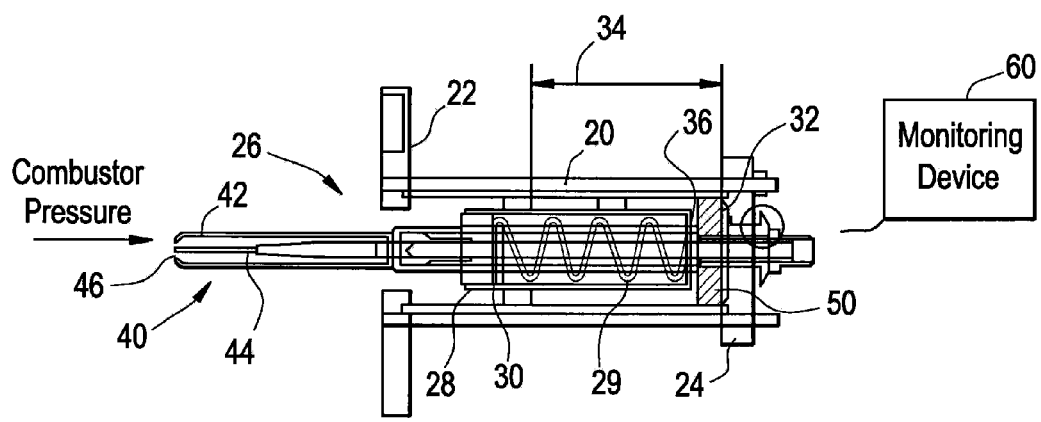
FIGS. 2A-2B are cross-sectional views of the apparatus comprising a spark plug integrated with a piezoelectric transducer for measuring the static pressure inside the combustor in accordance with one exemplary embodiment of the present invention.
Figure 2B:
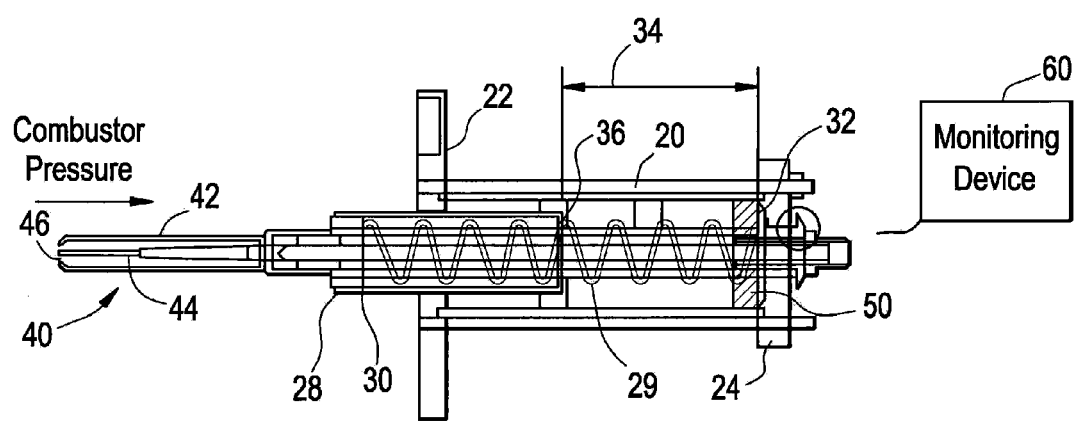

Referring now to FIG. 2A, the basic elements of the spark plug 12 generally include a main outer body or housing 20, which is formed from a metal in accordance with one exemplary embodiment. The housing 20 includes a mounting flange 22 and a base flange 24 in accordance with one embodiment. The spark plug 12 further includes a moveable component 26 with a piston assembly or a retractable body 28 disposed within the housing 20. In accordance with one exemplary embodiment, the moveable component 26 is a retractable probe. Of course, the moveable component 26 disposed within the housing can be any other mechanism configured to move or change in position in response to the fluids in the combustor chamber 18 in accordance with other exemplary embodiments. The retractable body 28 is configured to move in and out of the combustor chamber 18 in response to the static pressure in the combustor chamber 18. The retractable body 28 is held in its fully extended position, as illustrated in FIG. 2B, by a return spring 29, which has one end resting against a shoulder portion 30 of the retractable body 28 proximate the mounting flange 22 and another end resting against a shoulder 32 in the base flange 24. The retractable body 28 has a stroke distance generally indicated by reference numeral 34, which is defined between the base flange 24 of the housing 20 and a back end 36 of the retractable body 28 when the retractable body is in its fully extended position in accordance with one exemplary embodiment.

In accordance with one exemplary embodiment, the moveable component 26 further includes a tip assembly 40 with a plurality of inwardly extending tabs 42, which act as a side electrode, spaced from a central electrode 44 to define a spark discharge gap 46. When the spark plug 12 is connected to the combustor chamber 18 by the mounting flange 22, the tip assembly 40 extends into the chamber 18 as shown. In operation, when the pressure inside the combustor is low (before ignition) the retractable body 28 is held at its fully extended position, thus allowing the tip assembly 40 to fully extend into the combustor chamber. After ignition, the pressure in the combustor chamber 18 increases and the retractable body 28 is forced to retract until the back end 36 of the retractable body 28 stops against the shoulder 32 in the base flange 24. The pressure in the combustor chamber 18 also causes the tip assembly 40 or portions thereof to move out of the region of the flame in the combustor chamber 18, which prevents damage to the spark plug 12.

Formation of the retractable probe, which includes the retractable body and the tip assembly, may be formed in any conventional way and should not be limiting.

In accordance with one exemplary embodiment, a sensor 50 is disposed in the housing 20 and thermally protected from fluids inside the combustor chamber 18 when the housing 20 is coupled to the combustor. The sensor 50 is configured to enable the determination of the static pressure inside the combustor. In accordance with one exemplary embodiment, the sensor 50 is disposed axially between the retractable probe 26 and the base flange 24 of the housing 20. Specifically, the sensor 50 is axially disposed between the back end 36 of the retractable body 28 and the shoulder 32 in the base flange 24 in accordance with one exemplary embodiment. In one exemplary embodiment, the sensor 50 is secured to the shoulder 32 in the base flange 24 by any means for securing such as, for example a weld, a high-temperature glue, or any other known means. In accordance with one non-limiting exemplary embodiment, the sensor is configured to measure the axial pressure force acting on the retractable probe 26 once the retractable probe 26 is fully retracted and is pressing against the sensor 50, thus providing feedback on the static pressure inside the combustor chamber 18.

In accordance with one exemplary embodiment, a monitoring device 60 is selectively coupled to the sensor 50 for determining the static pressure inside the combustor chamber 18. In one embodiment, the monitoring device 60 is external to the housing 20 and is coupled to the sensor 50 of the spark plug 12 via cables in accordance with one exemplary embodiment. It is contemplated that in other exemplary embodiments the monitoring device 60 is configured to wirelessly communicate with the sensor 50.

The monitoring device 60 can be any type of standard instrumentation used for monitoring the health/condition/status of the engine and the components thereof as well as providing data (e.g., static pressure inside the combustor) for performance. In accordance with one exemplary embodiment, the monitoring device 60 is configured to determine the static pressure inside the combustor chamber 18 based on the measured force acting on the moveable component 26 and the predetermined surface area of the moveable component 26 being exposed to the static pressure inside the combustor chamber 18. The total surface area exposed to the static pressure inside the combustor may include the surface area of the tip assembly 40 and the surface area retractable body 28 facing the combustor chamber 18 in accordance with one exemplary embodiment.

In accordance with one exemplary embodiment, the monitoring device 60 comprises a processor having a combination of hardware and/or software/firmware with a computer program that, when loaded and executed, permits the processor of the computer to operate such that it carries out the methods described herein.

Figure 3:
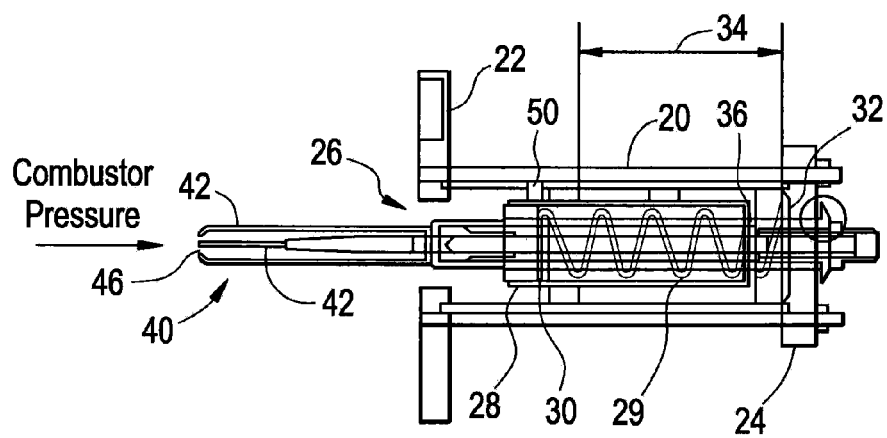
FIG. 3 is a cross-sectional view of the apparatus comprising a spark plug integrated with a strain gauge for measuring the static pressure inside the combustor in accordance with one exemplary embodiment of the present invention.

In accordance with one non-limiting exemplary embodiment, the sensor 50 is a pressure transducer of any convention type. In another non-limiting exemplary embodiment, the sensor 50 is a piezoelectric transducer of any conventional type as shown in FIG. 2. Alternatively, the sensor 50 is a strain gauge of any conventional type disposed on a surface portion of the retractable body 28 in accordance with one exemplary embodiment as illustrated in FIG. 3. The strain gauge measures the axial stress/force on the moveable component 26 when the same is fully retracted proximate to the base flange 24.

The strain gauge as the sensor 50 is configured to measure the axial stress/force on the moveable component 26 once the moveable component 26 is fully retracted proximate the base flange 24, thus providing feedback on the static pressure inside the combustor chamber 18. The force acting on the moveable component 26 increases as the static pressure inside the combustor chamber 18 increases. Thus, the force measured by the sensor 50 (e.g., piezoelectric transducer) changes as the static pressure inside the combustor chamber 18 changes.

Figure 4:
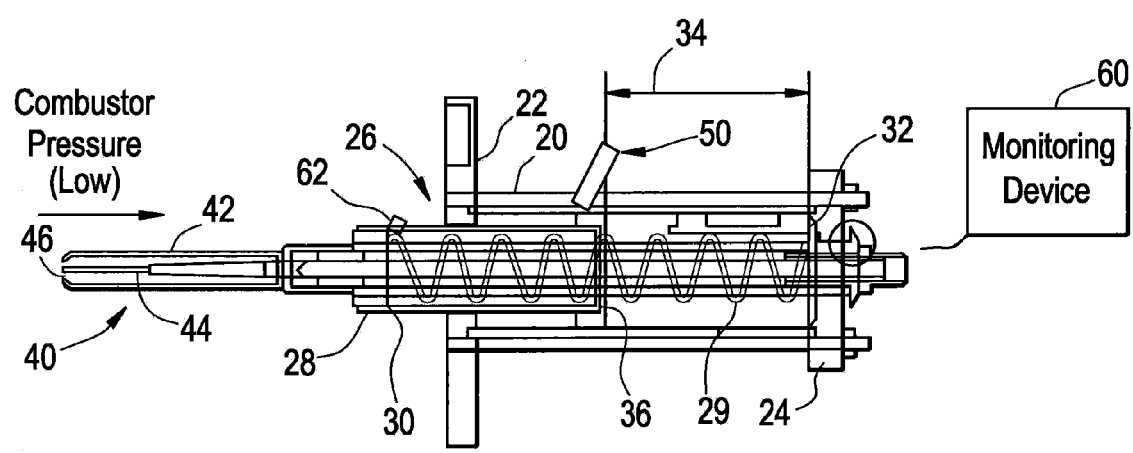
FIG. 4 is a cross-sectional view of the spark plug in a fully extended positioned and integrated with a capacitor probe for measuring the static pressure inside the combustor in accordance with one exemplary embodiment of the present invention.
Figure 5:
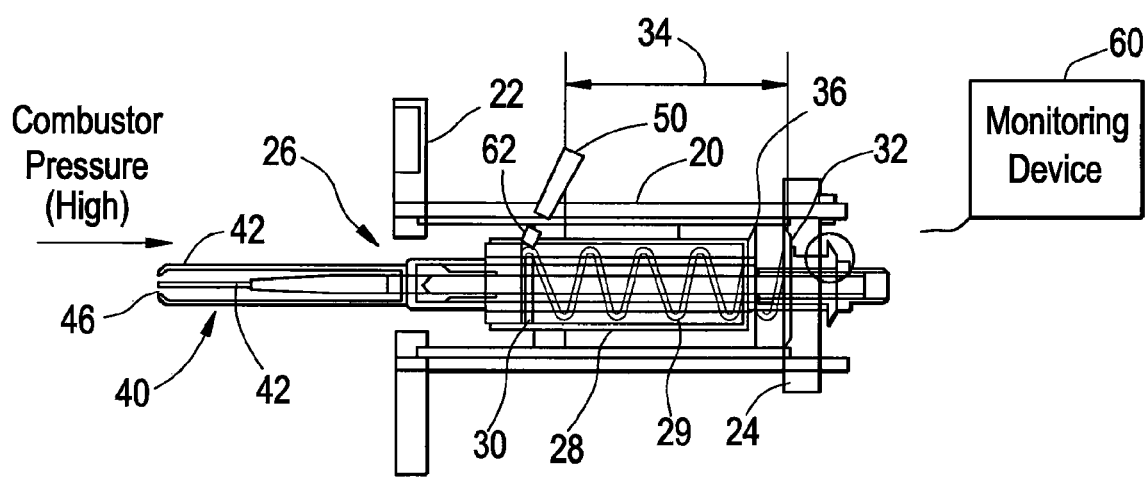
FIG. 5 is a cross-sectional view of the spark plug in a fully retracted position with the capacitor probe for measuring the static pressure inside the combustor in accordance with one exemplary embodiment of the present invention.

In an alternative exemplary embodiment of the present invention, the sensor 50 is a capacitor probe of any conventional type as shown in FIGS. 4 and 5. In FIG. 4, the moveable component 26 is shown in its fully extended position. In FIG. 5, the moveable component 26 is shown in its fully retracted position. In this embodiment, a reference feature 62 is located or machined on a surface of the retractable body 28 proximate a front end 64 of the retractable body 28 as illustrated in FIG. 4. The capacitor probe is configured to measure the amount of compression of the moveable component 26 by measuring the displacement of the reference feature 62 with respect to the capacitor probe. In other words, the amount of compression can be measured as an axial deflection by the capacitor probe (distance probe). In accordance with one exemplary embodiment, the monitoring device 60 operably translates or relates the measured axial deflection by the capacitor probe to an axial stress/force acting on the moveable component 26. The monitoring device 60 then determines the static pressure inside the combustor chamber 18 based on the axial force acting on the moveable component 26 and the total surface area of the moveable component 26 being exposed to the static pressure inside the combustor chamber 18 as described above.

It is contemplated that other types of sensors can be used to measure or enable the determination of the static pressure inside the combustor in accordance with other exemplary embodiments and should not be limited to the examples set forth herein.

It should be understood that the total surface area of the moveable component 26 being exposed to the static pressure inside the combustor chamber 18 depends on the design configuration of the moveable component 26, which can vary depending on the application and should not be limited to the configurations shown herein.

In accordance with an exemplary embodiment of the present invention an exemplary method for assembling a system for measuring the static pressure inside a combustor of a gas turbine is provided. The method generally includes disposing a moveable component (e.g., retractable probe 26) in a housing 20 where the moveable component operably extends into the combustor and retracts from the combustor in response to a static pressure inside the combustor. Then, disposing a sensor 50 to the housing in accordance with one exemplary embodiment. In one embodiment, the sensor 50 is secured to the housing 20 by any means for securing such as, for example a weld, a high-temperature glue, or any other known means. The sensor 50 is configured to measure the force acting on the moveable component in accordance with one exemplary embodiment. Alternatively, the sensor 50 measures the amount of compression on the moveable component as an axial deflection of the sensor 50 in accordance with other exemplary embodiments of the present invention. The sensor 50 can be disposed axially between the moveable component and the housing 20 in accordance with one embodiment. Alternatively, the sensor 50 can be disposed on a surface portion of the retractable probe in accordance with another embodiment. In doing so, significant hardware modifications to the combustor liner can be prevented. Next, coupling a monitoring device 60 to the sensor 50 via cables in accordance with one non-limiting exemplary embodiment. The monitoring device is configured to determine the static pressure inside the combustor based on the force acting on the moveable component and a predetermined surface area of the moveable component exposed to the static pressure inside the combustor.

Although exemplary embodiments described herein relate to a spark plug of varying configurations, it should be understood that the housing 20 coupled to the combustor can be a housing 20 for other types of known devices that when integrated with a sensor can measure the static pressure inside the combustor.

Furthermore, it is contemplated that the integrated apparatus described herein for measuring static pressure can be incorporated into various types of components/systems that have an internal pressure that can be measured in accordance with other exemplary embodiments and should not be limited to the components/systems described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus for measuring a static pressure inside a component, comprising:
   a housing coupled to the component, the housing includes a moveable component disposed therein, the moveable component operably extendable into the component and retractable from the component in response to the static pressure inside the component; and
   a sensor disposed in the housing and thermally protected from fluids inside the component, the sensor is configured to enable the determination of the static pressure inside the component,
   wherein the sensor is configured to measure a force acting on the moveable component, the force acting on the moveable component increases as the static pressure inside the component increases.

2. The apparatus as in claim 1, wherein the sensor is a pressure transducer.

3. The apparatus as in claim 1, wherein the moveable component is a retractable probe of a spark plug.

4. The apparatus as in claim 1, wherein the component is a combustor of a gas turbine.

5. The apparatus as in claim 1, wherein the static pressure inside the component is determined based on the force acting on the moveable component and a predetermined surface area of the moveable component exposed to the static pressure.

6. The apparatus as in claim 1, wherein the sensor is disposed axially between the moveable component and the housing.

7. The apparatus as in claim 1, wherein the sensor is disposed on a surface portion of the moveable component.

8. The apparatus as in claim 1, wherein the sensor is a strain gauge.

9. The apparatus as in claim 1, wherein the sensor is configured to measure the compression of the moveable component as an axial deflection by the sensor.

10. The apparatus as in claim 9, wherein the measured compression of the moveable component is translated to a force acting on the moveable component to determine the static pressure inside the component, the static pressure inside the component is determined based on the translated force acting on the moveable component and a predetermined surface area of the moveable component exposed to the static pressure.

11. The apparatus as in claim 1, wherein the sensor is a capacitor probe.

12. The apparatus as in claim 1, wherein the sensor is a piezoelectric transducer.

13. A system for measuring static pressure inside a combustor, comprising:
   a housing coupled to the combustor, the housing includes a moveable component disposed therein, the moveable component operably extendable into the combustor and retractable from the combustor in response to the static pressure inside the combustor;
   a sensor disposed in the housing and thermally protected from fluids inside the combustor, the sensor is configured to enable the determination of the static pressure inside the combustor; and
   a processor in communication with the sensor, the processor is configured to determine the static pressure inside the combustor,
   wherein the sensor is configured to measure a force acting on the moveable component, the force acting on the moveable component increases as the static pressure inside the component increases.

14. The system as in claim 13, wherein the processor determines the static pressure inside the combustor in response to the force acting on the moveable component and a predetermined surface area of the moveable component exposed to the static pressure.

15. The system as in claim 14, wherein the sensor is disposed axially between the moveable component and the housing.

16. The system as in claim 13, wherein the combustor is located inside a gas turbine.

17. A system for measuring static pressure inside a combustor, comprising:
   a housing coupled to the combustor, the housing includes a moveable component disposed therein, the moveable component operably extendable into the combustor and retractable from the combustor in response to the static pressure inside the combustor;
   a sensor disposed in the housing and thermally protected from fluids inside the combustor, the sensor is configured to enable the determination of the static pressure inside the combustor, the sensor is further configured to measure a force acting on the moveable component, the force acting on the moveable component increases as the static pressure inside the combustor increases; and
   a processor in communication with the sensor, the processor is configured to determine the static pressure inside the combustor.

18. The system as in claim 17, wherein the sensor is disposed axially between the moveable component and the housing.

19. The system as in claim 17, wherein the sensor is a piezoelectric transducer.

* * * * *